United States Patent
Li et al.

(10) Patent No.: US 11,194,040 B2
(45) Date of Patent: Dec. 7, 2021

(54) SLOW TIME FREQUENCY DIVISION MULTIPLEXING WITH BINARY PHASE SHIFTERS

(71) Applicant: Aptiv Technologies Limited, St. Michael (BB)

(72) Inventors: Zhengzheng Li, Agoura Hills, CA (US); Kurt J. Oster, Greentown, IN (US)

(73) Assignee: Aptiv Technologies Limited, St. Michael (BB)

( * ) Notice: Subject to any disclaimer, the term of this patent is extended or adjusted under 35 U.S.C. 154(b) by 218 days.

(21) Appl. No.: 16/507,699

(22) Filed: Jul. 10, 2019

(65) Prior Publication Data

US 2020/0025914 A1 Jan. 23, 2020

Related U.S. Application Data

(60) Provisional application No. 62/699,239, filed on Jul. 17, 2018.

(51) Int. Cl.
*G01S 13/931* (2020.01)
*G01S 13/26* (2006.01)
*G01S 13/534* (2006.01)
*G01S 13/00* (2006.01)

(52) U.S. Cl.
CPC ............ *G01S 13/931* (2013.01); *G01S 13/26* (2013.01); *G01S 13/534* (2013.01); *G01S 2013/9315* (2020.01); *G01S 2013/93271* (2020.01)

(58) Field of Classification Search
CPC .................................................. G01S 13/003
See application file for complete search history.

(56) References Cited

U.S. PATENT DOCUMENTS

| 7,474,262 | B2 | 1/2009 | Alland |
| 9,182,476 | B2 | 11/2015 | Wintermantel |
| 9,791,564 | B1 * | 10/2017 | Harris ................... G01S 13/931 |
| 10,281,572 | B1 | 5/2019 | Jakanovic et al. |

(Continued)

FOREIGN PATENT DOCUMENTS

WO 2018/115370 A1 6/2018

OTHER PUBLICATIONS

Takayama Takuya et al: "Hybrid SIMO and MIMO sparse array radar", Oct. 9, 2013, pp. 25-28.

(Continued)

*Primary Examiner* — Bernarr E Gregory
(74) *Attorney, Agent, or Firm* — Colby Nipper PLLC

(57) ABSTRACT

An illustrative example embodiment of a detector device includes a plurality of transmitters and a controller that controls the transmitters to transmit respective signals defined at least in part by a sequence of 2N pulses within a period. N is an integer greater than 1. A first one of the transmitters transmits 2N first signal pulses within the period. Each of the 2N first signal pulses have a first phase. A second one of the transmitters transmits 2N second signal pulses within the period. Each of the 2N first signal pulses is simultaneous with one of the 2N second signal pulses. N second signal pulses have a phase shift of 180° relative to the first phase. Others of the second signal pulses have the first phase. The N second signal pulses having the phase shift are immediately adjacent each other in the sequence.

17 Claims, 6 Drawing Sheets

(56) References Cited

U.S. PATENT DOCUMENTS

| | | |
|---|---|---|
| 2017/0160380 A1 | 6/2017 | Searcy et al. |
| 2017/0254879 A1 | 9/2017 | Tokieda et al. |
| 2018/0267555 A1 | 9/2018 | Li et al. |
| 2019/0081663 A1 | 3/2019 | Fu |

OTHER PUBLICATIONS

European Search Report for Application No. EP19185933, European Patent Office, dated Dec. 3, 2019.
Sturm, et al: "Automotive Fast-Chirp MIMO Radar with Simultaneous Transmission in a Doppler-Multiplex", The 19th International Radar Symposium IRS 2018, Jun. 20-22, 2018, Bonn, Germany, pp. 1-6.

* cited by examiner

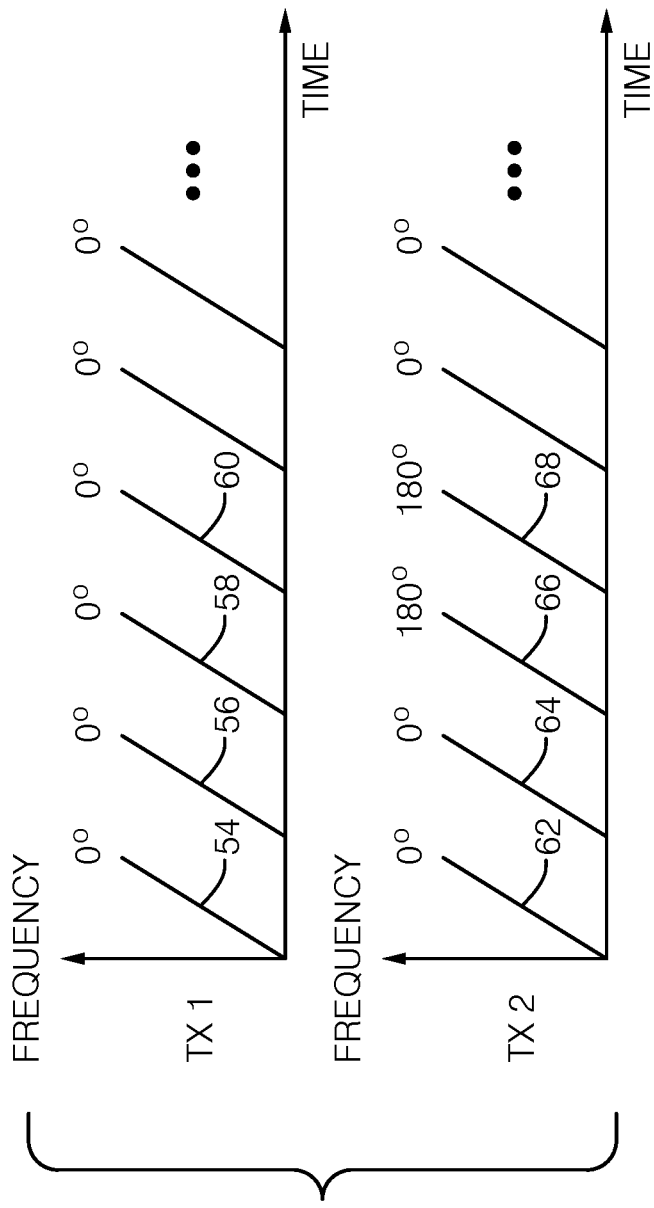

SLOW TIME FREQUENCY DIVISION MULTIPLEXING WITH BINARY PHASE SHIFTERS

BACKGROUND

Automotive radar sensors play a key role in Advanced Driver Assistance Systems (ADAS) as they provide information about the environment surrounding the host vehicle. Highly automated driving has demanded high resolution in range, Doppler and angle, especially the capability of discriminating multiple targets with the same range and Doppler, which requires more antenna channels.

MIMO (multiple-input multiple-output) approaches are popular for radar systems to achieve a larger number of antenna channels. For example, a typical MIMO radar system with three transmit (TX) channels and four receive (RX) channels can form a virtual array of 12 channels. Since the virtual array location is the spatial convolution of the TX antenna positions and the RX antenna positions, by placing the TX antennas and RX antennas in different ways, different virtual arrays can be formed to achieve better angular discrimination performance, reduce angular ambiguity, or both.

Waveform orthogonality is used in a MIMO radar system for transmitting and receiving independent, orthogonal RF-signals and being able to identify or separate the different TX channels in the same RX channel. There are various methods for implementing orthogonal waveforms including Time-Division Multiplexing (TDM), Frequency-Division Multiplexing (FDM), and Code Multiplexing (CM). There are pros and cons associated with each of the three approaches.

FDM places signals from TX channels to different frequency bands by adding frequency offsets to transmit signals. It is often realized in the fast-time (range) domain. Apart from a range-dependent phase offset that was introduced among channels and reduced unambiguous range coverage, the main drawback is that it requires a higher sampling rate due to the increased IF bandwidth.

Both FDM and CM methods can enable simultaneous transmission and both can be implemented in fast-time (within a chirp, range domain) and slow-time (chirp to chirp, Doppler domain). CM tries to recover a signal matching the current code by suppressing energy from other coded signals. The distributed energy left from the suppressed signals is often referred to as residue which limits the dynamic range of the system. A limited dynamic range limits the ability to detect a small object in the presence of a large object.

U.S. Pat. No. 7,474,262 describes a MIMO radar system concept with TDM that does not have simultaneous transmission. Instead, individual transmitters transmit sequentially which leads to no interference between TX channels and a maximum degree of orthogonality among TX channels. However, this technique does not provide the signal-to-noise ratio benefits realized with simultaneous transmission and leads to other issues, such as Doppler ambiguity among TX channels.

A technique that reduces the residue level is described in U.S. Pat. No. 9,952,319 to Searcy, et al. While the approach works well, it includes computational complexity and may be difficult to implement in real time. CM is often implemented in the slow-time Doppler domain as it requires specific transmitter and receiver design as well as higher IF bandwidth for fast-time implementation.

The publication by C. Sturm, Y. L. Sit, G. Li, H. A. Vayghan, U. Lübbert, titled "Automotive Fast-Chirp MIMO Radar with Simultaneous Transmission in a Doppler-Multiplex", Proc. IRS conference, 2018, describes an implementation of ST-FDM with binary phase shifters for a radar system with two TX channels.

U.S. Pat. No. 9,182,476 describes a radar system that has arrangements and methods for decoupling transmitted and received signals and for the suppression of interference radiation.

United States Published Application Number 2017/0160380 suggests a Pseudo-Random Phase Modulation (PRPM) scheme to achieve MIMO, residue cancellation, and improved dynamic range from high residue level of the PRPM scheme.

Even with such advances in the art there is a need for improvement. For example, the increased reliance on object detection on automotive vehicles increases the demand for better detection. Previously proposed approaches typically suffer from at least one drawback, such as not providing adequate discrimination among signals or not providing simultaneous transmission leading to smaller signal-to-noise ratios.

SUMMARY

An illustrative example embodiment of a detector device includes a plurality of transmitters and a controller that controls the transmitters to transmit respective signals defined at least in part by a sequence of 2N pulses within a period. N is an integer greater than 1. A first one of the transmitters transmits 2N first signal pulses within the period. Each of the 2N first signal pulses have a first phase. A second one of the transmitters transmits 2N second signal pulses within the period. Each of the 2N first signal pulses is simultaneous with one of the 2N second signal pulses. N second signal pulses have a phase shift of 180° relative to the first phase. Others of the second signal pulses have the first phase. The N second signal pulses having the phase shift are immediately adjacent each other in the sequence.

An example embodiment having one or more features of the detector device of the previous paragraph includes a binary phase shifter that introduces the phase shift of the N second signal pulses having the phase shift.

In an example embodiment having one or more features of the detector device of any of the previous paragraphs, a third one of the transmitters transmits 2N third signal pulses within the period, each of the 2N first signal pulses is simultaneous with one of the 2N third signal pulses, N third signal pulses have a phase shift of 180° relative to the first phase, others of the third signal pulses have the first phase, the N third signal pulses having the phase shift are immediately adjacent each other in the sequence, and at least one of the N third signal pulses having the phase shift is simultaneous with one of the second signal pulses having the first phase.

An example embodiment having one or more features of the detector device of any of the previous paragraphs includes a plurality of receivers. The receivers receive reflected signals that comprise the respective signals reflected by an object within a vicinity of the detector device, the reflected signals include a first portion corresponding to the 2N first signal pulses and a second portion corresponding to the 2N second signal pulses, the first portion has a single peak with a first magnitude at a first frequency, the second portion has two peaks separated by a second frequency, and the controller discriminates between the first portion and the second portion based on the second frequency.

In an example embodiment having one or more features of the detector device of any of the previous paragraphs, each of the two peaks has a magnitude that is less than the first magnitude.

In an example embodiment having one or more features of the detector device of any of the previous paragraphs, the magnitude of one of the two peaks is greater than the magnitude of another of the two peaks.

In an example embodiment having one or more features of the detector device of any of the previous paragraphs, the second frequency corresponds to the phase shift of 180°.

In an example embodiment having one or more features of the detector device of any of the previous paragraphs, the controller controls the transmitters to repeatedly transmit the respective signals over a plurality of periods and the second frequency remains constant over the plurality of periods.

In an example embodiment having one or more features of the detector device of any of the previous paragraphs, the single peak is always distinct from the two peaks.

An illustrative example method of detecting at least one object includes transmitting, from a first transmitter, a sequence of 2N first signal pulses within a period, each of the 2N first signal pulses having a first phase; and transmitting, from a second transmitter, a sequence of 2N second signal pulses within the period. Each of the 2N first signal pulses is simultaneous with one of the 2N second signal pulses, N second signal pulses have a phase shift of 180° relative to the first phase, others of the second signal pulses have the first phase, the N second signal pulses having the phase shift are immediately adjacent each other in the sequence, and N is an integer greater than 1.

An example embodiment having one or more features of the method of the previous paragraph includes using a binary phase shifter to introduce the phase shift of the N second signal pulses having the phase shift.

An example embodiment having one or more features of the method of any of the previous paragraphs includes transmitting, from a third transmitter, a sequence of 2N third signal pulses within the period. Each of the 2N first signal pulses is simultaneous with one of the 2N third signal pulses, N third signal pulses have a phase shift of 180° relative to the first phase, others of the third signal pulses have the first phase, the N third signal pulses having the phase shift are immediately adjacent each other in the sequence, and at least one of the N third signal pulses having the phase shift is simultaneous with one of the second signal pulses having the first phase.

An example embodiment having one or more features of the method of any of the previous paragraphs includes receiving reflected signals that comprise the first and second signal pulses reflected by an object, wherein the reflected signals include a first portion corresponding to the 2N first signal pulses and a second portion corresponding to the 2N second signal pulses, the first portion has a single peak with a first magnitude at a first frequency, the second portion has two peaks separated by a second frequency, and discriminating between the first portion and the second portion based on the second frequency.

In an example embodiment having one or more features of the method of any of the previous paragraphs, each of the two peaks has a magnitude that is less than the first magnitude.

In an example embodiment having one or more features of the method of any of the previous paragraphs, the magnitude of one of the two peaks is greater than the magnitude of another of the two peaks.

In an example embodiment having one or more features of the method of any of the previous paragraphs, the second frequency corresponds to the phase shift of 180°.

An example embodiment having one or more features of the method of any of the previous paragraphs includes repeatedly transmitting the sequences of respective signal pulses over a plurality of periods and wherein the second frequency remains constant over the plurality of periods.

In an example embodiment having one or more features of the method of any of the previous paragraphs, the single peak is always distinct from the two peaks.

An illustrative example embodiment of a detector device includes a plurality of transmitting means and control means for controlling the transmitting means to transmit respective signals defined at least in part by a sequence of 2N pulses within a period. N is an integer greater than 1, a first one of the transmitting means transmits 2N first signal pulses within the period, each of the 2N first signal pulses have a first phase, a second one of the transmitting means transmits 2N second signal pulses within the period, each of the 2N first signal pulses is simultaneous with one of the 2N second signal pulses, N second signal pulses have a phase shift of 180° relative to the first phase, others of the second signal pulses have the first phase, and the N second signal pulses having the phase shift are immediately adjacent each other in the sequence.

An example embodiment having one or more features of the detector device of the previous paragraph includes a plurality of receiving means. The receiving means receive reflected signals that comprise the respective signals reflected by an object within a vicinity of the detector device, the reflected signals include a first portion corresponding to the 2N first signal pulses and a second portion corresponding to the 2N second signal pulses, the first portion has a single peak with a first magnitude at a first frequency, the second portion has two peaks separated by a second frequency, and the control means discriminates between the first portion and the second portion based on the second frequency.

Various features and advantages of at least one disclosed embodiment will become apparent to those skilled in the art from the following detailed description. The drawings that accompany the detailed description can be briefly described as follows.

BRIEF DESCRIPTION OF THE DRAWINGS

FIG. 3 illustrates an example relationship between TX signals of two transmitters.

FIG. 4 schematically illustrates simultaneously transmitted signal pulses consistent with FIG. 3.

DETAILED DESCRIPTION

Embodiments of this invention facilitate achieving simultaneous transmission of multiple TX channels for a MIMO detector system with binary phase shifters. Disclosed example embodiments support multiple transmitters transmitting simultaneously with accurate recovery and without ambiguity. Accurate recovery is possible because there is no interference among TX channels. Ambiguity is not a problem because the disclosed scheme makes it possible to identify every channel in a received signal without additional information.

Figure 1:
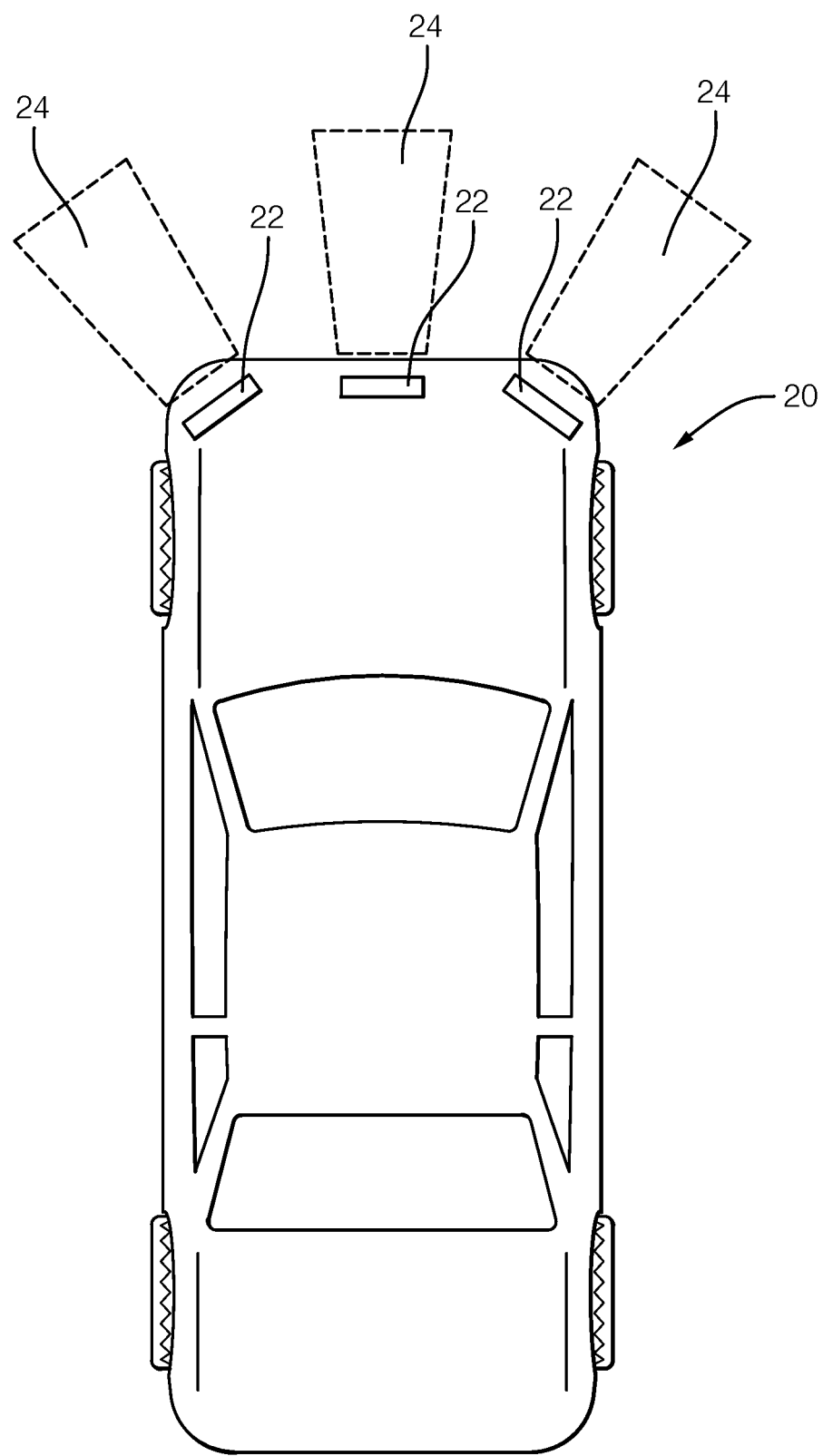
FIG. 1 schematically illustrates a vehicle including a plurality of detector devices.

FIG. 1 illustrates a vehicle 20 that includes a plurality of detectors 22 that are capable of detecting any objects in a field of view 24. For discussion purposes, the detectors 22 of the disclosed example embodiment are configured to use radio detection and ranging (RADAR) technology. Other detection technologies are useful in some embodiments, such as sonar and light detection and ranging (LIDAR).

Figure 2:
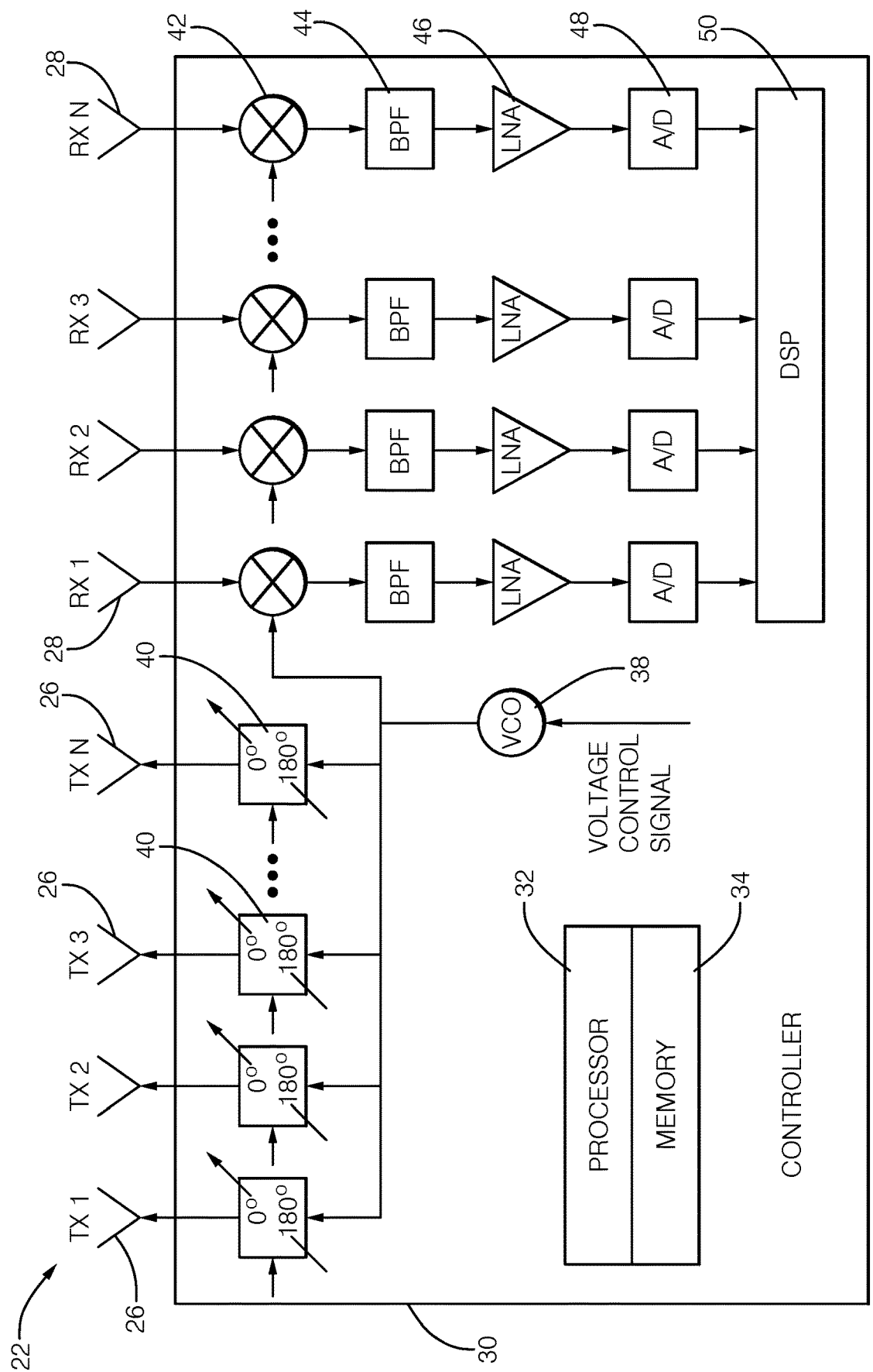
FIG. 2 schematically illustrates an example embodiment of a detector device.

FIG. 2 illustrates an example detector device 22. A plurality of transmitters 26, which are antenna in this example, are configured to transmit respective signals that are useful for detecting any objects in a vicinity of the vehicle 20 within the field of view of the detector 22. A plurality of receivers 28 are configured to receive reflected signals that are reflections of the transmitted signals after they reflect off an object.

A controller 30 includes a processor 32 and memory 34. At least the processor 32 includes programming or is otherwise configured to control operation of the transmitters 26. In the illustrated example embodiment, the controller 30 includes a voltage controlled oscillator 38 that provides the basis for signals transmitted by the transmitters 26. Binary phase shifters 40 are respectively associated with the transmitters 26 to control a phase shift applied to one or more signal pulses transmitted by the transmitters 26. Each binary phase shifter 40 has two output stages: 0° (pass-through) and 180° (flip the sign or reverse the phase). The binary phase shifters 40 in this example introduce a phase shift of $\pi$. In this example, the controller 30 is schematically shown as including the binary phase shifters 40 but they may be distinct components.

The receivers 28 receive reflected signals and the controller 30 processes such received signals to make one or more determinations regarding any objects within the field of view 24 (FIG. 1) of the detector device 22. The output of the voltage controlled oscillator 38, which serves as a reference, is combined with a received signal at 42. The received signal is then processed through a band pass filter 44, a low noise amplifier 46 and an analog to digital converter 48 before being analyzed by a digital signal processor 50 to make one or more determinations regarding any objects from which the received signal reflected. Although illustrated as separate processors 32 and 50, some embodiments include a single processor that controls the transmission and makes determinations from the reception of signals by the detector device 22.

FIGS. 3 and 4 schematically illustrate an example control strategy 52 for controlling two of the transmitters 26. A first one of the transmitters 26 transmits a sequence of 2N first signal pulses 54, 56, 58 and 60 within a period based on operation of the voltage controlled oscillator 38. Each of the first signal pulses has a first phase, which corresponds to 0° in this example. The first phase may be considered a base or reference phase. In this example, N=2 and there are four pulses in each period. A second period is illustrated in FIG. 3.

A second one of the transmitters 26 transmits second signal pulses 62, 64, 66 and 68 within the same period and at the same time as the first signal pulses 54, 56, 58 and 60. One aspect of the example detector device 22 is that every one of the first signal pulses is transmitted simultaneously with one of the second signal pulses. The controller 30 causes the binary phase shifter 40 associated with the second one of the transmitters 26 to introduce a phase shift of 180° on N of the second signal pulses. In this example, since N=2, only two of the second signal pulses include the phase shift in each period. The second signal pulses that include the phase shift are transmitted in sequence immediately adjacent each other without any pulses having a different phase between them. In other words, the second signal pulses that include the 180° phase shift are transmitted one immediately after the other until all N of them are transmitted within each period. The same pattern or sequence of pulses is repeated in each subsequent period.

Having first signal pulses and second signal pulses always transmitted simultaneously and including a phase shift for N out of 2N pulses per period makes it possible to accurately recover the received signal information without ambiguity. The MIMO features reduce or eliminate signal-to-noise loss. A Doppler bin representation of an example received signal is schematically shown at 70 in FIG. 5. A first portion of the received signal corresponds to the first signal pulses and includes a single peak 72. A second portion of the received signal corresponds to the second signal pulses and includes two peaks 74 and 76. The peak 72 has a first magnitude and is centered at a first frequency, which is dependent on the base frequency of the first signal pulses, such as 0°. The two peaks 74 and 76 have second magnitudes and are separated by a second frequency represented at 80. The phase shift included with N of the second signal pulses and the sequential manner in which those pulses are transmitted within the period (i.e., immediately adjacent to each other) establishes the two peaks 74 and 76 and the second frequency 80 that separates them. The controller 30 distinguishes between the portion of the received signal corresponding to the first signal pulses and the portion corresponding to the second signal pulses based on the second frequency 80.

The consistent separation of the two peaks 74 and 76 allows for always discerning the portion of the received signal corresponding to the second signal pulses, which minimizes or eliminates any ambiguity between the first and second portions of the received signal. Always transmitting a pulse from every actively transmitting transmitter simultaneously increases the amount of signaling information available compared to other techniques that only transmitted from a second transmitter part of the time. The disclosed signaling technique provides superior detection compared to previous MIMO techniques.

The controller 30 uses the first and second portions of the received signal for detection and analysis based on principles of Doppler frequency shifts in reflected signals and the signaling technique that includes a sequence of 2N transmitted pulses, simultaneous transmission of all pulses from multiple transmitters, and a binary phase shift for N of the 2N pulses. A moving object causes a progressive phase difference among pulses that introduces the Doppler frequency shift in the received signal. This can be represented by the following equation $$x(k\Delta t) = e^{j\omega_d k \Delta t} + n(k)$$

where x represents the received signal, k represents a pulse, $\Delta t$ is the pulse repetition time, $n(k)$ represents noise and $\omega_d$ is the Doppler frequency.

The phase modulation $C(k)$ introduced by the binary phase modulator 40 for the disclosed example phase modulation scheme with 2N repeated phase terms per period can be represented by the following equation $$C(k) = \frac{1}{N}\sum_{n=1}^{N} e^{jk\left[\frac{\pi}{N}+(n-1)\frac{2\pi}{N}\right]}$$

wherein the $n^{th}$ peak for the $m^{th}$ code is described by $$\omega_d + \frac{\pi}{N} + (n-1)\frac{2\pi}{N} = \omega_d + (2n-1)\frac{\pi}{N}$$

The amplitude at the $n^{th}$ peak for the $m^{th}$ code is $$\frac{1}{N}\sum_{k=0}^{N-1} e^{-jk(2n-1)\frac{\pi}{N}} e^{j(m-1)(2n-1)\frac{\pi}{N}}$$

which can be further simplified to $$\frac{2}{N} \cdot \frac{e^{jm(2n-1)\frac{\pi}{N}}}{e^{j(2n-1)\frac{\pi}{N}} - 1}$$

Figure 5:
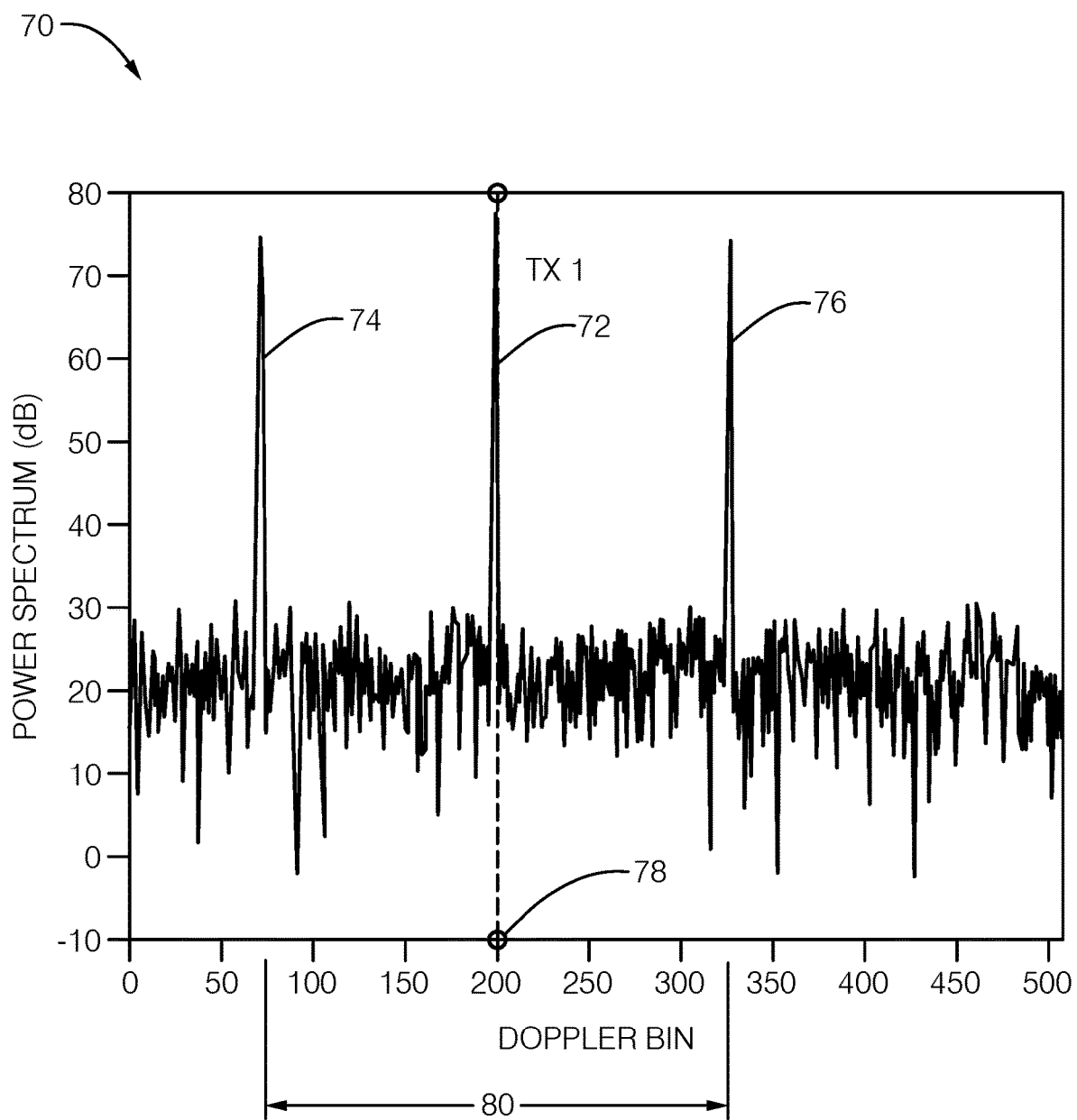
FIG. 5 graphically illustrates a received signal in a Doppler frequency bin representation.

Turning to the example of FIGS. 3-5, the phase modulation is described by $$C(k) = \frac{1}{2}\left(e^{jk\frac{\pi}{2}} + e^{j-k\frac{\pi}{2}} + e^{jk\frac{\pi}{2}}e^{j-\frac{\pi}{2}} + e^{j-k\frac{\pi}{2}}e^{j\frac{\pi}{2}}\right)$$

where $e^{jk(\pi/2)}$ corresponds to $$\omega_d + \frac{\pi}{2}, e^{j-k(\pi/2)}$$

corresponds to $$\omega_d - \frac{\pi}{2}, e^{j-(\pi/2)}$$

corresponds to $-j$, and $e^{j(\pi/2)}$ corresponds to $+j$.

Using S to denote a slow time Fast Fourier Transform, the controller 30 (or the DSP 50) determines the single peak 72 based on $S(\omega_d)$. The two peaks 74 and 76 are obtained by the controller 30 based on $$S\left(\omega_d + \frac{\pi}{2}\right) + S\left(\omega_d - \frac{\pi}{2}\right).$$

The amplitude of the peak 74 is 0.5(1+j)*TX2 and the amplitude of the peak 76 is 0.5(1−j)*TX2. When combined, the peaks 74 and 76 have the same power as TX1. In some embodiments the peaks 74 and 76 are each 3 dB lower than the single peak 72. The controller uses such information regarding the received signal to make desired or necessary determinations regarding an object in the vicinity or pathway of the vehicle 20.

Figure 6:
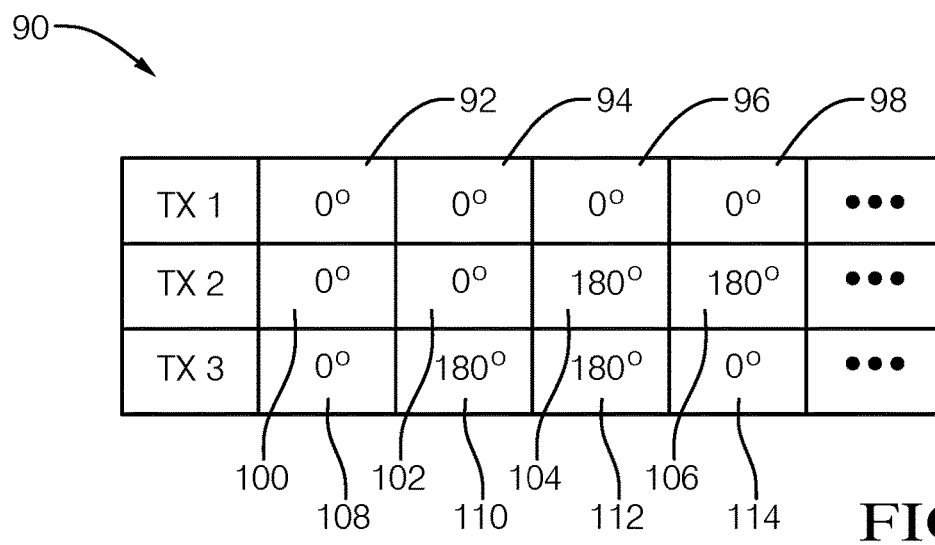
FIG. 6 illustrates an example relationship between TX signals of three transmitters.
Figure 7:
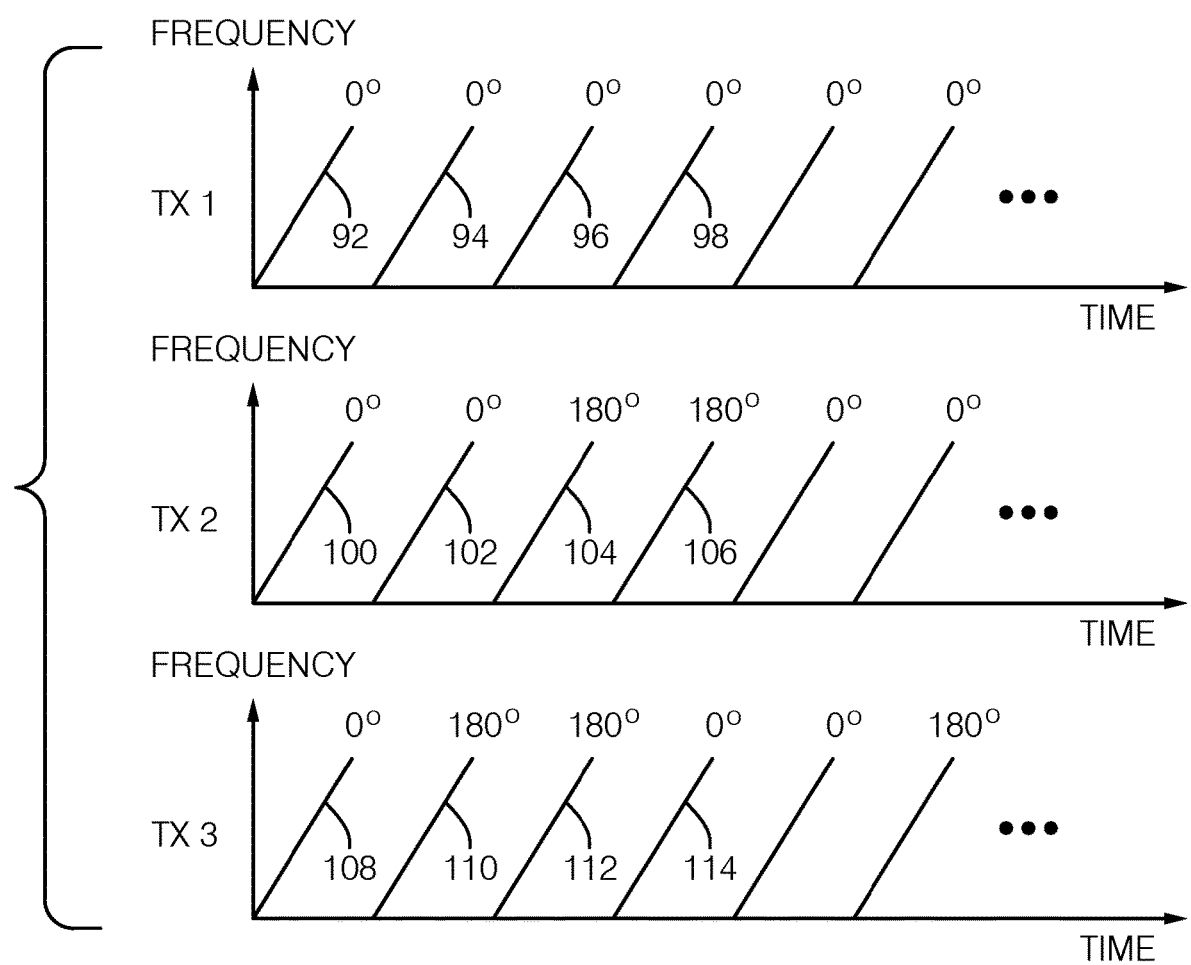
FIG. 7 schematically illustrates simultaneously transmitted signal pulses consistent with FIG. 6.

While two transmitters 26 are included in the above example, the disclosed approach supports any number of transmitters using simultaneous pulse transmission with N of the 2N pulses having a phase shift for all but one of the transmitters. FIGS. 6 and 7 schematically illustrate a transmission scheme using a period of four pulses and N=2. A first one of the transmitters 26 transmits a sequence of first signal pulses 92, 94, 96 and 98 without any phase shift. A second one of the transmitters 26 transmits a sequence of second signal pulses 100, 102, 104 and 106. Two of the second signal pulses 104 and 106 include a phase shift relative to the first phase of the first signal pulses 92-98, which is introduced by the binary phase shifter 40 associated with the second transmitter 26. A third transmitter 26 transmits a sequence of four third signal pulses 108, 110, 112, 114 within the same period. The two pulses 110 and 112 include the phase shift relative to the first phase of the pulses 92-98.

As can be appreciated from FIGS. 6 and 7, every time the first transmitter 26 transmits one of the first signal pulses 92-98, the second and third transmitters transmit one of the respective signal pulses.

The second signal pulses 104 and 106 include the phase shift and are timed relative to the third signal pulses so that at least one of the third signal pulses 110 and 112 that include the phase shift is transmitted simultaneously with one of the second signal pulses that does not include any phase shift relative to the first phase of the first signal pulses. In the illustration, the pulse 110 including a phase shift is simultaneous with the pulse 102 that does not include a phase shift. Staggering the phase shifted pulses of the second and third transmitters within the period while maintaining the pattern of phase shifted pulses (i.e., keeping them immediately adjacent each other in the sequence) allows for distinguishing the portion of the received signal corresponding to the second signal pulses and the portion of the received signal corresponding to the third signal pulses.

FIG. 5 is also a Doppler bin representation of the received signal resulting from a reflection of the signal pulses represented in the illustrations of FIGS. 6 and 7. In this case, the TX1 (e.g., the first portion) of the received signal is obtained by the DSP 50 from $S(\omega_d)$ and TX2 and TX3 can be obtained from the following linear equations:

$$S\left(\omega_d - \frac{\pi}{2}\right) = 0.5(1+j)*TX2 + 0.5(1-j)*TX3$$

$$S\left(\omega_d + \frac{\pi}{2}\right) = 0.5(1-j)*TX2 + 0.5(1+j)*TX3$$

where the magnitude of the peak 74 is described by $$S\left(\omega_d - \frac{\pi}{2}\right)$$

and the magnitude of the peak 76 is described by $$S\left(\omega_d + \frac{\pi}{2}\right).$$

For up to 3 TX channels, the disclosed phase modulation scheme is based on a sequence of 4 (i.e., N=2) repeated phase terms in each period. It supports any period that includes a number of pulses that is a multiple of 4, such as 64 or 512. When N=2, only three independent codes are available which means up to three TXs are supported using a total of four code combinations. This is because energy is divided into three peaks in the slow time spectrum. Different combinations can be obtained by changing the initial phase of TX2 and TX3 from 0° to 180°.

Additional orthogonal codes can be used by extending the repeated phase terms to 6 (i.e., N=3), 8 (i.e., N=4) or even more terms. As the period grows the spectrum would become more congested due to more peaks and channels but the manner in which the multiple peaks of the channels that include the phase shifted pulses still allows for distinguishing among the portions of the received signal corresponding to each channel.

For example when N=3, energy is divided into three peaks and the detector device 22 supports four independent TX channels each having its own sequence of signal pulses. If combining codes with 4 repeated phase terms and 6 repeated phase terms, the disclosed phase modulation scheme can support total of 6 TXs with the phase length (i.e., 2N) being set to a multiple of 12, such as 60. For 8 repeated phase terms, energy is divided into four peaks, so the detector device 22 can support four independent TX channels. Note that, two of the peaks from 8 repeated phase terms would overlap with the two peaks from 4 repeated phase terms so it is better to combine with 6 repeated phase terms to get the best performance by supporting a total of 8 TX channels.

Figure 8:
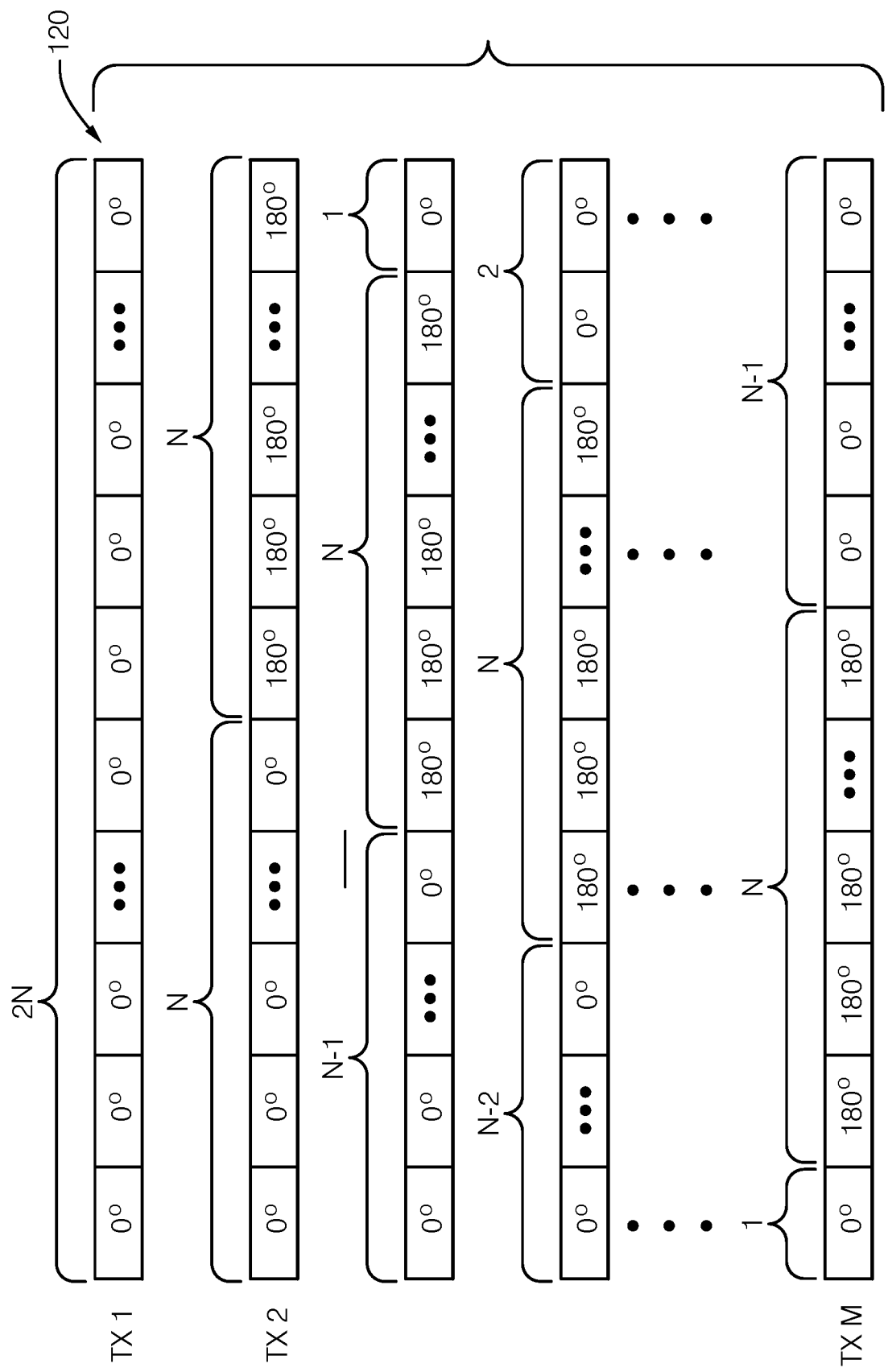
FIG. 8 illustrates a relationship among sequences of signal pulses for any number of transmitters.

FIG. 8 illustrates how the disclosed transmission technique can be applied to any number m of transmitters 26 and transmit channels TX, where m=N+1. The first signal pulses at 120 all have the first phase 0° throughout the entire sequence of 2N pulses. Each sequence of signal pulses for the other TXs includes 2N terms per period with N of those including the phase shift introduced by the corresponding binary phase shifter 40. The N pulses having the phase shift are kept immediately adjacent each other in the sequence even though the number of pulses without any phase shift may vary between the ends of the sequence and the N pulses having the phase shift. For example, TX2 includes N pulses having the first frequency 0° before the N pulses including the phase shift. TXm has only one pulse with the first frequency before the N pulses including the phase shift. Staggering the position of the N pulses including the phase shift within the respective sequences as illustrated allows for distinguishing each TX from the others. The order in each sequence can be considered a different code and each TX has a unique code.

Although the first phase of the first signal pulses of TX1 is 0° in the above examples, it is possible to add a random code to TX1 for interference mitigation purpose. Codes for TX2 through any TXm can be modified accordingly so that the phase difference among channels are maintained consistent with the technique described above.

The improved MIMO approach used in the disclosed embodiments supports multiple TXs transmitting simultaneously and yields reliable recovery of the TX channels from a received signal without ambiguity. The disclosed example embodiments provide a technique that enable simultaneous transmission and recovery of multiple TX channels in the slow-time (Doppler) spectrum using binary phase modulation. The disclosed ST-FDM scheme shifts energy from different TXs to different frequency bins in the slow-time Doppler frequency spectrum. It also improves detection dynamic range and signal to clutter ratio and processing efficiency.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A detector device, comprising:
   a plurality of transmitters;
   a controller that controls the transmitters to transmit respective signals defined at least in part by a sequence of 2N pulses within a period; and
   a plurality of receivers,
   wherein
   N is an integer greater than 1;
   a first one of the transmitters transmits 2N first signal pulses within the period;
   each of the 2N first signal pulses have a first phase;
   a second one of the transmitters transmits 2N second signal pulses within the period;
   each of the 2N first signal pulses is simultaneous with one of the 2N second signal pulses;
   N second signal pulses have a phase shift of 180° relative to the first phase;
   others of the second signal pulses have the first phase;
   the N second signal pulses having the phase shift are immediately adjacent each other in the sequence;
   the receivers receive reflected signals that comprise the respective signals reflected by an object within a vicinity of the detector device;
   the reflected signals include a first portion corresponding to the 2N first signal pulses and a second portion corresponding to the 2N second signal pulses;
   the first portion has a single peak with a first magnitude at a first frequency;
   the second portion has two peaks separated by a second frequency; and
   the controller discriminates between the first portion and the second portion based on the second frequency.

2. The detector device of claim 1, comprising a binary phase shifter that introduces the phase shift of the N second signal pulses having the phase shift.

3. The detector device of claim 1, wherein
   a third one of the transmitters transmits 2N third signal pulses within the period,
   each of the 2N first signal pulses is simultaneous with one of the 2N third signal pulses,
   N third signal pulses have a phase shift of 180° relative to the first phase,
   others of the third signal pulses have the first phase,
   the N third signal pulses having the phase shift are immediately adjacent each other in the sequence, and
   at least one of the N third signal pulses having the phase shift is simultaneous with one of the second signal pulses having the first phase.

4. The detector device of claim 1, wherein each of the two peaks has a magnitude that is less than the first magnitude.

5. The detector device of claim 4, wherein the magnitude of one of the two peaks is greater than the magnitude of another of the two peaks.

6. The detector device of claim 1, wherein the second frequency corresponds to the phase shift of 180°.

7. The detector device of claim 1, wherein
   the controller controls the transmitters to repeatedly transmit the respective signals over a plurality of periods; and
   the second frequency remains constant over the plurality of periods.

8. The detector device of claim 1, wherein the single peak is always distinct from the two peaks.

9. A method of detecting at least one object, the method comprising:
- transmitting, from a first transmitter, a sequence of 2N first signal pulses within a period, each of the 2N first signal pulses having a first phase;
- transmitting, from a second transmitter, a sequence of 2N second signal pulses within the period;
- receiving reflected signals that comprise the first and second signal pulses reflected by an object, wherein the reflected signals include a first portion corresponding to the 2N first signal pulses and a second portion corresponding to the 2N second signal pulses, the first portion has a single peak with a first magnitude at a first frequency, the second portion has two peaks separated by a second frequency; and
- discriminating between the first portion and the second portion based on the second frequency,
- wherein each of the 2N first signal pulses is simultaneous with one of the 2N second signal pulses, N second signal pulses have a phase shift of 180° relative to the first phase, others of the second signal pulses have the first phase, the N second signal pulses having the phase shift are immediately adjacent each other in the sequence, and N is an integer greater than 1.

10. The method of claim 9, comprising using a binary phase shifter to introduce the phase shift of the N second signal pulses having the phase shift.

11. The method of claim 9, comprising transmitting, from a third transmitter, a sequence of 2N third signal pulses within the period,
- wherein each of the 2N first signal pulses is simultaneous with one of the 2N third signal pulses, N third signal pulses have a phase shift of 180° relative to the first phase, others of the third signal pulses have the first phase, the N third signal pulses having the phase shift are immediately adjacent each other in the sequence, and at least one of the N third signal pulses having the phase shift is simultaneous with one of the second signal pulses having the first phase.

12. The method of claim 9, wherein each of the two peaks has a magnitude that is less than the first magnitude.

13. The method of claim 12, wherein the magnitude of one of the two peaks is greater than the magnitude of another of the two peaks.

14. The method of claim 9, wherein the second frequency corresponds to the phase shift of 180°.

15. The method of claim 9, comprising repeatedly transmitting the sequences of respective signal pulses over a plurality of periods and wherein the second frequency remains constant over the plurality of periods.

16. The method of claim 9, wherein the single peak is always distinct from the two peaks.

17. A detector device, comprising:
- a plurality of transmitting means;
- control means for controlling the transmitting means to transmit respective signals defined at least in part by a sequence of 2N pulses within a period; and
- a plurality of receiving means, wherein:
- N is an integer greater than 1,
- a first one of the transmitting means transmits 2N first signal pulses within the period,
- each of the 2N first signal pulses have a first phase,
- a second one of the transmitting means transmits 2N second signal pulses within the period,
- each of the 2N first signal pulses is simultaneous with one of the 2N second signal pulses,
- N second signal pulses have a phase shift of 180° relative to the first phase,
- others of the second signal pulses have the first phase,
- the N second signal pulses having the phase shift are immediately adjacent each other in the sequence,
- the receiving means receive reflected signals that comprise the respective signals reflected by an object within a vicinity of the detector device,
- the reflected signals include a first portion corresponding to the 2N first signal pulses and a second portion corresponding to the 2N second signal pulses,
- the first portion has a single peak with a first magnitude at a first frequency,
- the second portion has two peaks separated by a second frequency, and
- the control means discriminates between the first portion and the second portion based on the second frequency.

* * * * *